(12) United States Patent
Chen et al.

(10) Patent No.: US 12,355,291 B2
(45) Date of Patent: Jul. 8, 2025

(54) SWITCHING CHARGER CAPABLE OF ACCURATELY SENSING SMALL CURRENT

(71) Applicant: ANPEC ELECTRONICS CORPORATION, Hsinchu (TW)

(72) Inventors: Chih-Ning Chen, Taipei (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 584 days.

(21) Appl. No.: 17/894,131

(22) Filed: Aug. 23, 2022

(65) Prior Publication Data

US 2023/0283097 A1 Sep. 7, 2023

(30) Foreign Application Priority Data

Mar. 4, 2022 (TW) .................................. 111107849

(51) Int. Cl.
*H02J 7/00* (2006.01)

(52) U.S. Cl.
CPC ........ *H02J 7/00714* (2020.01); *H02J 7/0024* (2013.01)

(58) Field of Classification Search
CPC .. H02J 7/00714; H02J 7/0024; H02J 2207/20; H02J 7/007182; H02J 7/04
USPC ....................................................... 320/134
See application file for complete search history.

(56) References Cited

U.S. PATENT DOCUMENTS

| | | | | |
|---|---|---|---|---|
| 7,236,376 B2* | 6/2007 | Yang | ................. | H02M 3/33523 363/21.04 |
| 8,198,868 B2* | 6/2012 | Pagano | ............. | H02J 7/007182 320/137 |
| 8,742,815 B2* | 6/2014 | Wadhwa | .......... | H03K 3/356104 327/277 |
| 9,882,482 B1* | 1/2018 | Hendry | ................. | H02M 3/158 |
| 10,041,982 B2* | 8/2018 | Hu | ......... | G01R 19/00 |
| 11,199,564 B2* | 12/2021 | Jan | ..................... | G01R 19/0092 |
| 2014/0049238 A1* | 2/2014 | Hu | ............................ | G05F 1/10 323/282 |
| 2023/0003771 A1* | 1/2023 | Huang | .................... | H03F 3/343 |

* cited by examiner

*Primary Examiner* — M Baye Diao
(74) *Attorney, Agent, or Firm* — Li & Cai Intellectual Property Office (57) ABSTRACT

A switching charger for accurately sensing a small current is provided. First terminals of first transistors and a second transistor are coupled to a system voltage. Second terminals of the first transistors and a first input terminal of an operational amplifier are connected to a battery. A first terminal of a third transistor is connected to a second terminal of the second transistor and a second input terminal of the operational amplifier. A control terminal of the third transistor is connected to an output terminal of the operational amplifier. A first terminal of a fourth transistor is connected to a second terminal of the third transistor. First terminals of fifth transistors are coupled to an input voltage. Control terminals of the first transistors and the fifth transistors are connected to a control circuit. First terminals of sixth transistors are respectively connected to second terminals of the fifth transistors.

19 Claims, 8 Drawing Sheets

SWITCHING CHARGER CAPABLE OF ACCURATELY SENSING SMALL CURRENT

CROSS-REFERENCE TO RELATED PATENT APPLICATION

This application claims the benefit of priority to Taiwan Patent Application No. 111107849, filed on Mar. 4, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a switching charger, and more particularly to a switching charger for accurately sensing a small current.

BACKGROUND OF THE DISCLOSURE

In recent years, with the continuous advancement of technology, various electronic products with different functions have gradually been developed to satisfy different requirements. Such electronic products have become an indispensable part of people's daily lives and make people's lives more convenient. The electronic product may include a plurality of electronic components to which different power voltages need to be supplied. Therefore, a conventional switching charger is used to convert input voltages into different appropriate power voltages, and supply the appropriate power voltages respectively to the electronic components for allowing the electronic product to operate normally. However, the conventional switching charger cannot accurately sense a charging current, especially a charging current having a small current value.

SUMMARY OF THE DISCLOSURE

In response to the above-referenced technical inadequacies, the present disclosure provides a switching charger for accurately sensing a small current. The switching charger includes a first current mirror, a first operational amplifier, a third transistor, a second current mirror and a control circuit. The first current mirror includes a plurality of first transistors and a second transistor. A first terminal of each of the plurality of first transistors and a first terminal of the second transistor are coupled to a system voltage. A second terminal of each of the plurality of first transistors is connected to a battery. A first input terminal of the first operational amplifier is connected to the battery and obtains a voltage of the battery. A first terminal of the third transistor is connected to a second terminal of the second transistor and a second input terminal of the first operational amplifier. A control terminal of the third transistor is connected to an output terminal of the first operational amplifier. The second current mirror includes a fourth transistor, a plurality of fifth transistors and a plurality of sixth transistors. A first terminal of the fourth transistor is connected to a second terminal of the third transistor and a control terminal of the fourth transistor. A second terminal of the fourth transistor is grounded. A first terminal of each of the plurality of fifth transistors is connected to a first terminal of a sensing resistor. A second terminal of the sensing resistor is coupled to an input voltage. First terminals of the plurality of sixth transistors are respectively connected to second terminals of the plurality of fifth transistors. A second terminal of each of the plurality of sixth transistors is grounded. Control terminals of the plurality of sixth transistors are connected to a control terminal of the fourth transistor. A control terminal of one of the plurality of first transistors is connected to a control terminal of the second transistor. The control circuit is connected to control terminals of others of the plurality of first transistors and a control terminal of each of the plurality of fifth transistors. The control circuit selectively turns off the plurality of first transistors and the plurality of fifth transistors to adjust a value of a current flowing through the sensing resistor.

In certain embodiments, the switching charger further includes a reference resistor. A first terminal of the reference resistor is connected to the control circuit. A second terminal of the reference resistor is grounded. The control circuit selectively turns off the plurality of first transistors and the plurality of fifth transistors according to a resistance of the reference resistor.

In certain embodiments, the switching charger further includes a reference current source. The reference current source is connected to the first terminal of the reference resistor. The reference current source is configured to provide a reference current to the reference resistor. The control circuit multiplies the resistance of the reference resistor by a value of the reference current to obtain a voltage of the reference resistor, and selectively turns off the plurality of first transistors and the plurality of fifth transistors according to the voltage of the reference resistor.

In certain embodiments, the switching charger further includes a detector circuit. The detector circuit is connected to the control circuit and the first terminal of the reference resistor. The detector circuit is configured to detect and provide the voltage of the first terminal of the reference resistor or the resistance of the reference resistor to the control circuit.

In certain embodiments, the control circuit is connected to a storage circuit. The control circuit selectively turns off the plurality of first transistors and the plurality of fifth transistors according to data provided by the storage circuit.

In certain embodiments, the control circuit selectively turns off the plurality of first transistors and the plurality of fifth transistors according to a charging current of the battery.

In certain embodiments, the switching charger further includes a voltage selector. An input terminal of the voltage selector is connected to the battery and coupled to the system voltage. An output terminal of the voltage selector is connected to a fourth terminal of each of the plurality of first transistors and a fourth terminal of the second transistor. The voltage selector is configured to select and output a highest one of the system voltage and the voltage of the battery to the fourth terminal of each of the plurality of first transistors and the fourth terminal of the second transistor.

In certain embodiments, the switching charger further includes a first amplifier. A first input terminal of the first amplifier is connected to the first terminal of the sensing resistor. A second input terminal of the first amplifier is coupled to a first reference voltage. An output terminal of the first amplifier is connected to the control terminal of each of the plurality of first transistors and the control terminal of the second transistor. The first amplifier is configured to amplify a difference between a voltage of the first terminal of the sensing resistor and the first reference voltage to output an amplified signal to the control terminal of each of the plurality of first transistors and the control terminal of the second transistor.

In certain embodiments, the switching charger further includes a first comparator. A first input terminal of the first comparator is coupled to the system voltage. A second input terminal of the first comparator is connected to the battery and obtains the voltage of the battery. An output terminal of the first comparator is connected to an input terminal of the control circuit.

In certain embodiments, the second input terminal of the first comparator is connected to a first terminal of a voltage source. A second terminal of the voltage source is connected to the battery.

In certain embodiments, the switching charger further includes a plurality of multiplexers. A first input terminal of each of the plurality of multiplexers is connected to the output terminal of the voltage selector. Second terminals of the plurality of multiplexers are connected to the output terminal of the first amplifier. Output terminals of the plurality of multiplexers are respectively connected to the control terminals of the plurality of first transistors. The control circuit is connected to a control terminal of each of the plurality of multiplexers. The control circuit controls the plurality of multiplexers to respectively control the plurality of first transistors, according to an amplified signal outputted by the first amplifier, or according to the highest one of the system voltage and the voltage of the battery that is selected by the voltage selector.

In certain embodiments, the switching charger further includes a seventh transistor, eighth transistor and a second operational amplifier. A control terminal of the seventh transistor is connected to the control terminal of the fourth transistor. A first terminal of the seventh transistor is grounded. A first terminal of the eighth transistor is connected to a second terminal of the seventh transistor. A control terminal of the eighth transistor is connected to the control circuit. A first input terminal of the second operational amplifier is connected to the battery and obtains the voltage of the battery. An output terminal of the second operational amplifier is connected to a second input terminal of the second operational amplifier and a second terminal of the eighth transistor.

In certain embodiments, the switching charger further includes a main control circuit, a driving circuit, a high-side switch and a low-side switch. An input terminal of the main control circuit is connected to the output terminal of the second operational amplifier. An input terminal of the driving circuit is connected to an output terminal of the main control circuit. A first terminal of the high-side switch is coupled to a common voltage. A control terminal of the high-side switch is connected to an output terminal of the driving circuit. A first terminal of the low-side switch is connected to a second terminal of the high-side switch. A second terminal of the low-side switch is grounded. A control terminal of the low-side switch is connected to the output terminal of the driving circuit. A node between the first terminal of the low-side switch and the second terminal of the high-side switch is connected to a first terminal of an inductor, and a second terminal of the inductor is grounded.

In certain embodiments, the switching charger further includes a first resistor. A first terminal of the first resistor is connected to the output terminal of the second operational amplifier. A second terminal of the first resistor is connected to the second terminal of the eighth transistor.

In certain embodiments, the switching charger further includes an error amplifier. A first input terminal of the error amplifier is connected to the second terminal of the first resistor. A second input terminal of the error amplifier is coupled to a second reference voltage.

In certain embodiments, the switching charger further includes a voltage divider circuit. The divider circuit includes a second resistor and a third resistor. A first terminal of the second resistor is connected to the second terminal of the inductor. A second terminal of the second resistor is connected to a first terminal of the third resistor. A second terminal of the third resistor is grounded. A voltage of a node between the second terminal of the second resistor and the first terminal of the third resistor is used as the second reference voltage.

In certain embodiments, the switching charger further includes a second comparator. A first input terminal of the second comparator is connected to an output terminal of a ramp signal generator. A second input terminal of the second comparator is connected to an output terminal of the error amplifier. An output terminal of the second comparator is connected to the input terminal of the main control circuit.

In certain embodiments, the switching charger further includes a third operational amplifier. A first input terminal of the third operational amplifier is connected to the node between the second terminal of the second resistor and the first terminal of the third resistor. A second input terminal of the third operational amplifier is coupled to a third reference voltage. An output terminal of the third operational amplifier is connected to the second input terminal of the error amplifier.

In certain embodiments, the switching charger further includes a fourth resistor. A first terminal of the fourth resistor is connected to the output terminal of the third operational amplifier. A second terminal of the fourth resistor is connected to the second input terminal of the error amplifier.

As described above, the present disclosure provides the switching charger for accurately sensing a small current. In the switching charger of the present disclosure, the plurality of first transistors and the plurality of fifth transistors can be selectively turned off to selectively adjust a ratio of the input current and the output current of the first current mirror and/or a ratio of the input current and the output current of the fifth current mirror. As a result, the current of the sensing resistor is adjusted. In particular, the current of the sensing resistor that is smaller than the setting current threshold is increased. The adjusted current is used as the current sensed by the switching charger of the present disclosure. Furthermore, a voltage difference between the system voltage and the battery voltage can be adjusted according to the charging current of the battery such that a charging efficiency of the switching charger of the present disclosure is improved. A proportion of an offset voltage of the first operational amplifier to the voltage difference between the system voltage and the battery voltage is reduced, such that an influence of the offset of the first operational amplifier on a sensing accuracy of the sensed current of the sensing resistor is reduced. Therefore, an external processor circuit can perform appropriate operations according to a value of the accurate sensed current.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
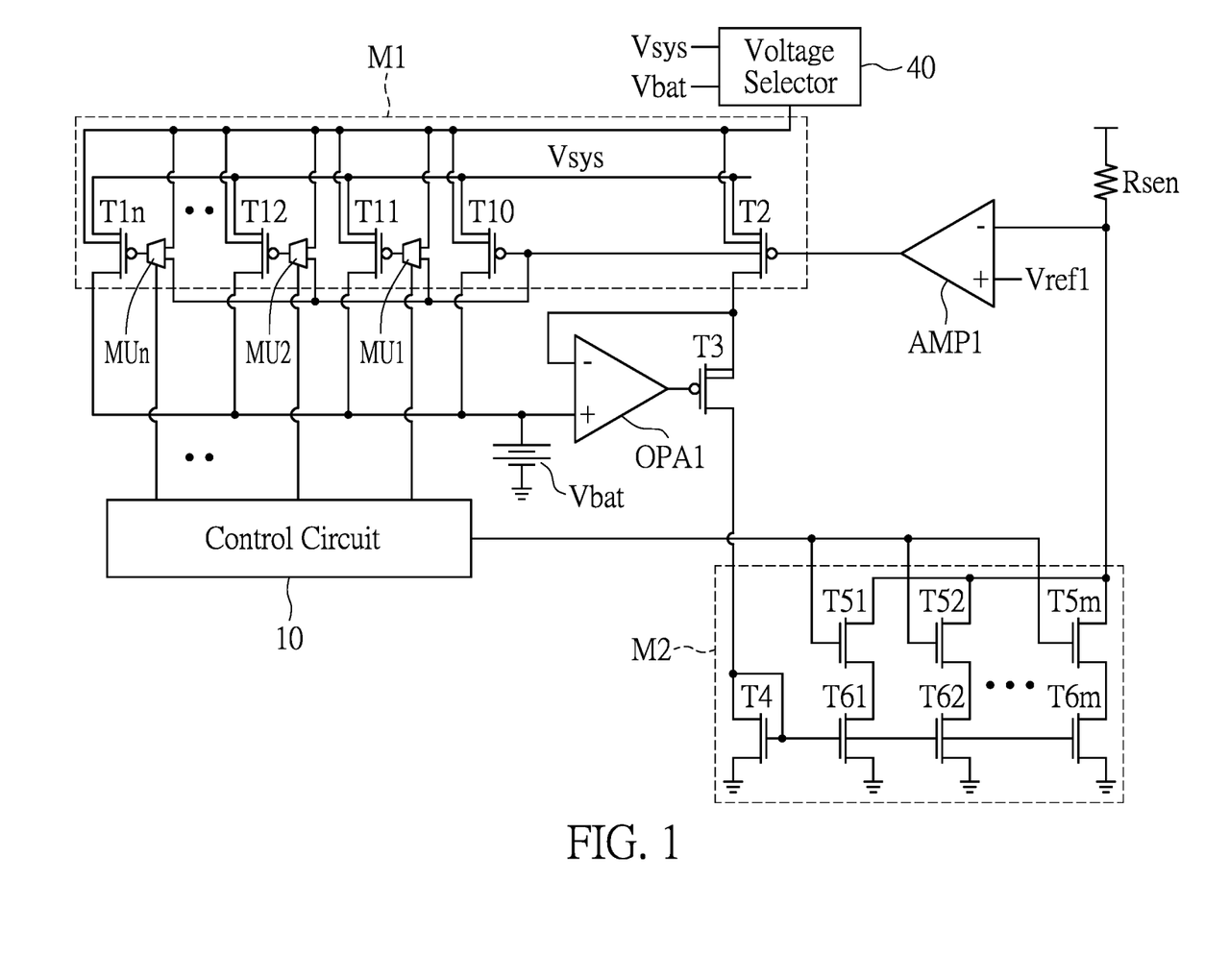
FIG. 1 is a circuit diagram of a switching charger for accurately sensing a small current according to a first embodiment of the present disclosure.

Reference is made to FIG. 1, which is a circuit diagram of a switching charger for accurately sensing a small current according to a first embodiment of the present disclosure.

The switching charger of the embodiment of the present disclosure may include a first current mirror M1, a control circuit 10, a first operational amplifier OPA1, a third transistor T3, a second current mirror M2, a voltage selector 40 and a sensing resistor Rsen, but the present disclosure is not limited thereto.

The first current mirror M1 may include a plurality of first transistors T10 to T1$n$ and a second transistor T2. The number of the first transistors T10 to T1$n$ included in the first current mirror M1 may be determined according to actual requirements. In the embodiment, sizes of the first transistors T10 to T1$n$ and the second transistor T2 are the same, but the present disclosure is not limited thereto.

A first terminal of each of the first transistors T10 to T1$n$ and a first terminal of the second transistor T2 may be coupled to a system voltage Vsys. A second terminal of each of the first transistors T10 to T1$n$ may be connected to a battery and receive a battery voltage Vbat from the battery. In other words, the second terminal of each of the first transistors T10 to T1$n$ may be coupled to the battery voltage Vbat.

A first input terminal such as a non-inverting terminal of the first operational amplifier OPA1 may be connected to the battery and receive the battery voltage Vbat from the battery. A second input terminal such as an inverting terminal of the first operational amplifier OPA1 may be connected to a first terminal of the third transistor T3. The first terminal of the third transistor T3 may be connected to a second terminal of the second transistor T2. A control terminal of the third transistor T3 may be connected to an output terminal of the first operational amplifier OPA1 The first operational amplifier OPA1 amplifies a difference between a voltage of the first input terminal of the first operational amplifier OPA1 and a voltage of the second input terminal of the first operational amplifier OPA1 to output a first amplified signal to the control terminal of the third transistor T3.

In addition, the second current mirror M2 may include a fourth transistor T4, a plurality of fifth transistors T51 to T5$m$ and a plurality of sixth transistors T61 to T6$m$. In the embodiment, the number of the fifth transistors T51 to T5$m$ is equal to the number of the sixth transistors T61 to T6$m$, but the present disclosure is not limited thereto. The number of the fifth transistors T51 to T5$m$ and the sixth transistors T61 to T6$m$ that are included in the second current mirror M2 may be determined according to actual requirements.

A first terminal of the fourth transistor T4 may be connected to a second terminal of the third transistor T3 and a control terminal of the fourth transistor T4. A second terminal of the fourth transistor T4 may be grounded. A first terminal of each of the plurality of fifth transistors T51 to T5$m$ may be connected to a first terminal of the sensing resistor Rsen. A second terminal of the sensing resistor Rsen may be coupled to an input voltage.

First terminals of the plurality of sixth transistors T61 to T6$m$ may be respectively connected to second terminals of the plurality of fifth transistors T51 to T5$m$. A second terminal of each of the plurality of sixth transistors T61 to T6$m$ may be grounded. A control terminal of each of the plurality of sixth transistors T61 to T6$m$ may be connected to the control terminal of the fourth transistor T4.

If necessary, the switching charger of the embodiment of the present disclosure may further include a first amplifier AMP1. A first input terminal such as an inverting input terminal of the first amplifier AMP1 may be connected to the first terminal of the sensing resistor Rsen. A second input terminal such as a non-inverting input terminal of the first amplifier AMP1 may be coupled to a first reference voltage Vref1. An output terminal of the first amplifier AMP1 may be connected to the control terminal of each of the plurality of first transistors T10 to T1$n$ and a control terminal of the second transistor T2.

The first amplifier AMP1 may amplify a difference between a voltage of the first terminal of the sensing resistor Rsen and the first reference voltage Vref1 to output an amplified signal to the control terminal of each of the plurality of first transistors T10 to T1$n$ and the control terminal of the second transistor T2. The plurality of first transistors T10 to T1$n$ and the second transistor T2 are driven according to the amplified signal.

If necessary, the switching charger of the embodiment of the present disclosure may further include a plurality of multiplexers MU1 to MUn. The first input terminal of each of the plurality of multiplexers MU1 to MUn may be connected to an output terminal of the voltage selector 40. The second terminals of the plurality of multiplexers MU1 to MUn may be connected to the output terminal of the first amplifier AMP1. Output terminals of the plurality of multiplexers MU1 to MUn may be respectively connected to the control terminals of the plurality of first transistors T11 to T1$n$.

An input terminal of the voltage selector 40 may be connected to the battery and receive the battery voltage Vbat from the battery. The input terminal of the voltage selector 40 may be coupled to the system voltage Vsys. The output terminal of the voltage selector 40 may be connected to a fourth terminal of each of the plurality of first transistors T10 to T1$n$ and a fourth terminal of the second transistor T2.

The voltage selector 40 may select and output the highest one of the system voltage Vsys and the battery voltage Vbat to the fourth terminal of each of the plurality of first transistors T10 to T1$n$ and the fourth terminal of the second transistor T2. As a result, the plurality of first transistors T10 to T1$n$ and the second transistor T2 can be normally turned off.

It is worth noting that, the voltage selector 40 may select and output the highest one of the system voltage Vsys and the battery voltage Vbat to the first input terminal of each of the plurality of multiplexers MU1 to MUn. The control circuit 10 may be connected to a control terminal of each of the plurality of multiplexers MU1 to MUn. The control circuit 10 may control the plurality of multiplexers MU1 to MUn to respectively control the plurality of first transistors T11 to T1$n$, according to the amplified signal outputted by the first amplifier AMP1 or according to the highest one of the system voltage Vsys and the battery voltage Vbat that is selected by the voltage selector 40.

It is worth noting that, all of the transistors of current mirrors of a conventional switching charger are always turned on. However, in the switching charger of the present disclosure, an output terminal of the control circuit 10 may be connected to control terminals of all or some of the plurality of first transistors T11 to T1$n$ and the plurality of fifth transistors T51 to T5$m$. The control circuit 10 may selectively turn off the plurality of first transistors T11 to T1$n$ and the plurality of fifth transistors T51 to T5$m$ to adjust a value of a current flowing through the sensing resistor Rsen, details of which are specifically described in the following.

Under the premise that an offset voltage does not exist between the voltage of the first input terminal of the first operational amplifier OPA1 and the voltage of the second input terminal of the first operational amplifier OPA1, a ratio of an input current of the first current mirror M1 to an output current of the first current mirror M1 is substantially equal to a ratio of the number of the first transistors T11 to T1$n$ being turned on to the number of the second transistor T2.

When the number of the first transistors T10 to T1$n$ being turned on is N, a ratio of the input current flowing through the first transistors T10 to T1$n$ to the output current flowing through the second transistor T2 is N:1. In other words, the output current flowing through the second transistor T2 is equal to the input current flowing through each of the first transistors T10 to T1$n$ that is divided by the N.

The number of the first transistors T11 to T1$n$ being turned off may depend on a charging current of the battery. For example, the number of the first transistors T11 to T1$n$ being turned off may be proportional to the charging current of the battery. The smaller the charging current of the battery (that is the input current flowing through each of the first transistors T10 to T1$n$) is, the more the first transistors T11 to T1$n$ are turned off by the control circuit 10, the less the first transistors T11 to T1$n$ are turned on by the control circuit 10, the smaller the N is, and the larger the output current of the second transistor T2 is.

The ratio of an input current of the second current mirror M2 to an output current of the second current mirror M2 is substantially equal to a ratio of the number of the fourth transistor T4 to the number of the fifth transistors T51 to T5$m$ being turned on. That is, when the number of the fifth transistors T51 to T5$m$ being turned on is M, the ratio of the input current of the fourth transistor T4 to the output current of the fifth transistors T51 to T5$m$ is 1:M. In other words, the output current of each of the plurality of fifth transistors T51 to T5$m$ is equal to the input current of the fourth transistor T4 that is multiplied by the M.

Therefore, the smaller the charging current of the battery is, the more the fifth transistors T51 to T5$m$ are turned on by the control circuit 10, the larger the M is, and the larger the output current flowing through each of the plurality of fifth transistors T51 to T5$m$ is. As a result, the output current has a target current value.

Under the premise that the offset voltage does not exist between the voltage of the first input terminal of the first operational amplifier OPA1 and the voltage of the second input terminal of the first operational amplifier OPA1, the value of the current flowing through the sensing resistor Rsen is substantially equal to a value of the charging current of the battery (that is the input current flowing through the first transistor T10) that is divided by the N and multiplied by the M.

That is, the control circuit 10 may selectively turn off one or more of the first transistors T11 to T1$n$ of the first current mirror M1 to adjust the ratio of the input current of the first current mirror M1 to the output current of the first current mirror M1, according to the value of the charging current of the battery. For example, when the charging current of the battery is smaller than a charging current threshold, the control circuit 10 may selectively turn off one or more of the first transistors T11 to T1$n$ of the first current mirror M1. In addition or alternatively, the control circuit 10 may selectively turn on one or more of the plurality of fifth transistors T51 to T5$m$ of the second current mirror M2 to adjust the ratio of the input current of the second current mirror M2 to the output current of the second current mirror M2, according to the value of the charging current of the battery. As a result, the current of the sensing resistor Rsen can be adjusted to be larger than a sensing current threshold. Under this condition, an external processor can easily and accurately determine the value of the current flowing through the sensing resistor Rsen and perform appropriate operations accordingly.

Conversely, when the charging current of the battery is larger than the charging current threshold, the control circuit 10 may always turn on all of the first transistors T11 to T1n and the second current mirror M2 that are included in the first current mirror M1, and selectively turn off all of the fourth transistor T4, the plurality of fifth transistors T51 to T5m and the plurality of sixth transistors T61 to T6m that are included in second current mirror M2.

Figure 2:
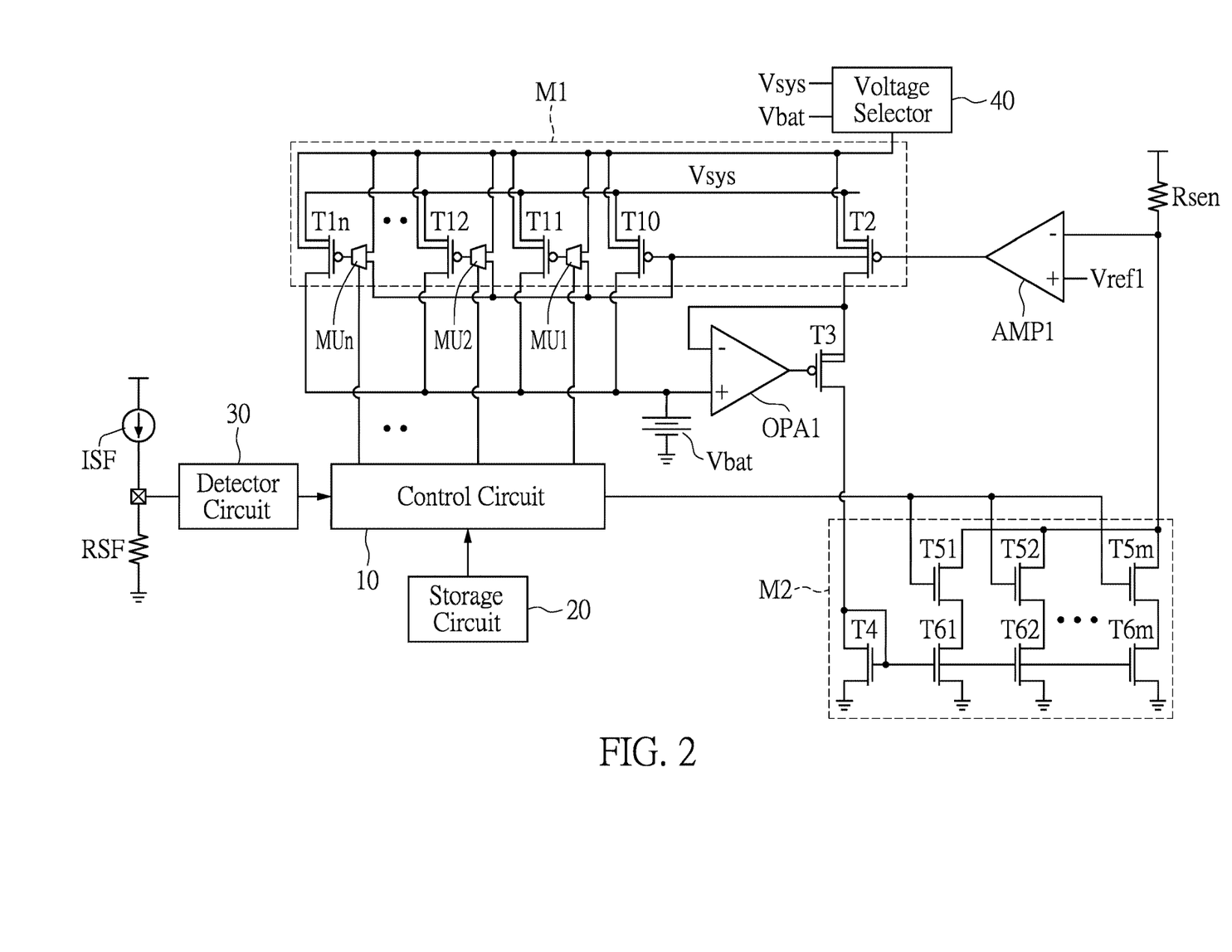
FIG. 2 is a circuit diagram of a switching charger for accurately sensing a small current according to a second embodiment of the present disclosure.

Reference is made to FIG. 2, which is a circuit diagram of a switching charger for accurately sensing a small current according to a second embodiment of the present disclosure. The same descriptions of the first and second embodiments are not repeated herein.

The control circuit 10 of the switching charger of the embodiment of the present disclosure may be connected to a storage circuit 20 or other external circuits. The control circuit 10 may selectively turn off the first transistors T11 to T1n and the plurality of fifth transistors T51 to T5m, according to data provided by the storage circuit or other external circuits.

Alternatively, the switching charger of the embodiment of the present disclosure may include one or more of a detector circuit 30, a reference resistor RSF and a reference current source ISF.

A first terminal of the reference resistor RSF may be connected to the control circuit 10 (through the detector circuit 30). A second terminal of the reference resistor RSF is grounded. The detector circuit 30 may be connected to the control circuit 10 and the first terminal of the reference resistor RSF. The control circuit 10 may directly obtain a value of a voltage of the first terminal of the reference resistor RSF or a resistance of the reference resistor RSF that is detected by the detector circuit 30. The reference resistor RSF may be a fixed resistor or a variable resistor. The resistance of the reference resistor RSF may be determined according to the charging current of the battery.

The first terminal of the reference resistor RSF may be connected to the reference current source ISF. The reference current source ISF may provide a reference current to the reference resistor RSF. The control circuit 10 may directly obtain the resistance of the reference resistor RSF or obtain the resistance of the reference resistor RSF from the detector circuit 30. The control circuit 10 may multiply the resistance of the reference resistor RSF by a value of the reference current of the reference current source ISF to obtain the voltage of the reference resistor RSF. Then control circuit 10 may selectively turn off the plurality of first transistors T11 to T1n and the plurality of fifth transistors T51 to T5m according to the voltage of the reference resistor RSF.

Figure 3:
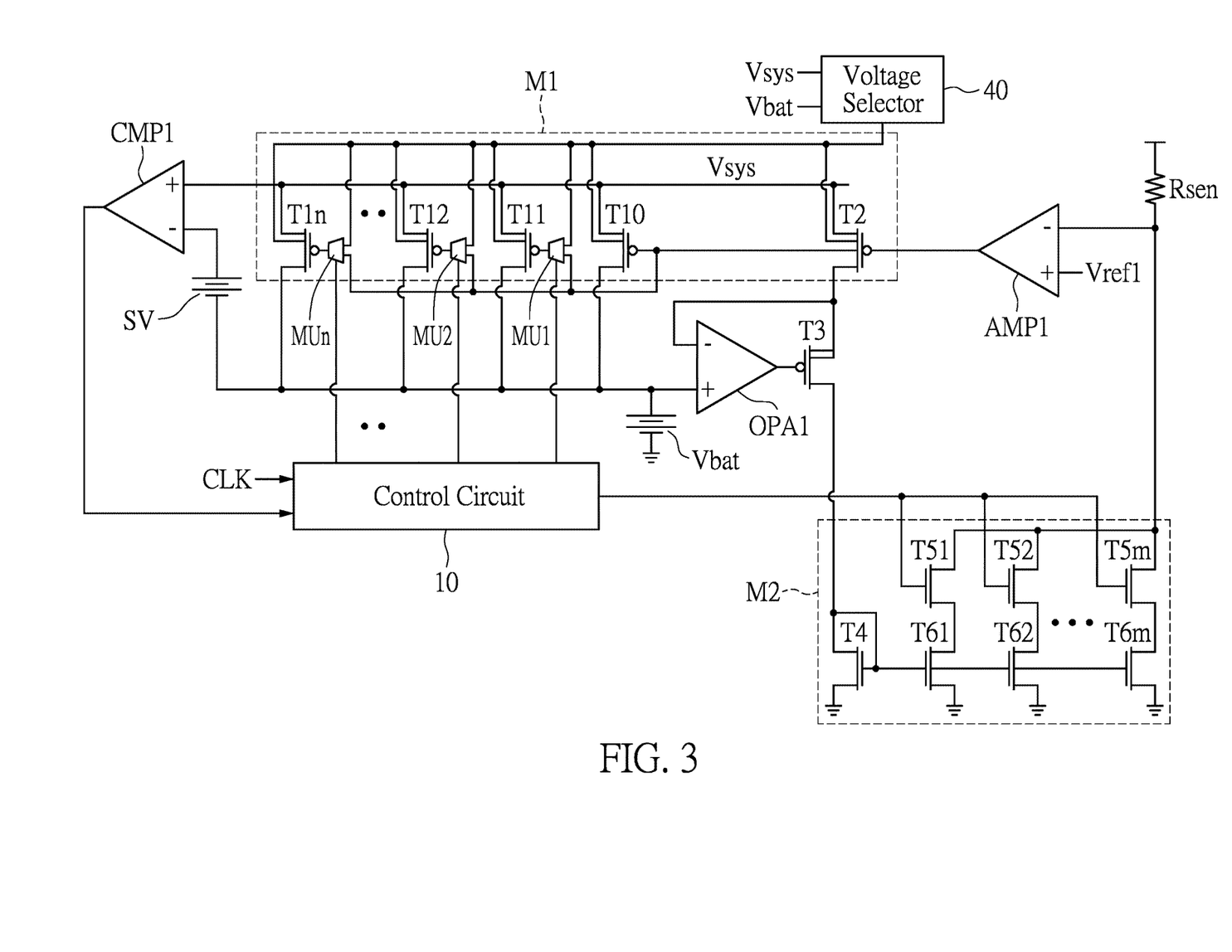
FIG. 3 is a circuit diagram of a switching charger for accurately sensing a small current according to a third embodiment of the present disclosure.

Reference is made to FIG. 3, which is a circuit diagram of a switching charger for accurately sensing a small current according to a third embodiment of the present disclosure. The same descriptions of the first and third embodiments are not repeated herein. A difference between the first and third embodiments is that, the battery voltage Vbat is approximately equal to the system voltage Vsys in the third embodiment.

The switching charger of the embodiment of the present disclosure may further include a first comparator CMP1. A first input terminal such as a non-inverting input terminal of the first comparator CMP1 may be coupled to the system voltage Vsys. A second input terminal such as an inverting input terminal of the first comparator CMP1 may be connected to the battery and receive the battery voltage Vbat from the battery. An output terminal of the first comparator CMP1 may be connected to an input terminal of the control circuit 10.

If necessary, the switching charger of the embodiment of the present disclosure may further include a voltage source SV. The voltage source SV may be connected between the second input terminal of the first comparator CMP1 and the battery. In detail, the second input terminal of the first comparator CMP1 may be connected to a first terminal such as a positive terminal of the voltage source SV. A second terminal such as a negative terminal of the voltage source SV may be connected to the battery.

Ideally, the voltage of the first input terminal of the first operational amplifier OPA1 is equal to the voltage of the second input terminal of the first operational amplifier OPA1 However, in reality, an offset voltage can unexpectedly be generated between the voltage of the first input terminal of the first operational amplifier OPA1 and the voltage of the second input terminal of the first operational amplifier OPA1 during manufacturing processes of the first operational amplifier OPA1 Therefore, an offset current can be included in a current flowing through the third transistor T3. As a result, a ratio of the input current flowing through the first transistors T10 to T1n to the output current flowing through the second transistor T2 is not equal to the ratio of the number of the first transistors T10 to T1n being turned on to the number of the second transistor T2. That is, the offset voltage between the first and second input terminals of the first operational amplifier OPA1 results in an error in the ratio of the input current flowing through the first transistors T10 to T1n to the output current flowing through the second transistor T2. As a result, a sensing accuracy of the switching charger is affected. In particular, when the charging current of the battery has a small current value such that a low voltage is across the first and second terminals of each of the first transistors T10 to T1n, the sensing accuracy of the switching charger is seriously affected.

Therefore, the first comparator CMP1 may compare the system voltage Vsys with the battery voltage Vbat to output a first comparing signal to the control circuit 10. Alternatively, the first comparator CMP1 may compare the system voltage Vsys with a sum of the battery voltage Vbat and a voltage of the voltage source SV to output the first comparing signal to the control circuit 10. Further, the control circuit 10 may selectively turn off the plurality of first transistors T11 to T1n of the first current mirror M1 and the plurality of fifth transistors T51 to T5m of the second current mirror M2, according to the first comparing signal.

The smaller a voltage difference between the battery voltage Vbat of the battery being charged and the system voltage Vsys is, the more the first transistors T11 to T1n are turned off by the control circuit 10, the less the first transistors T11 to T1n are turned on by the control circuit 10, and the larger the total resistance of the first transistors T11 to T1n being connected in parallel in the first current mirror M1 is. As a result, the larger the voltage calculated by multiplying a resistance of the first transistor 10 by the current flowing through the first current mirror M1 (that is the charging current of the battery) is, the smaller a proportion of the offset voltage of the first operational amplifier OPA1 to the voltage difference between the system voltage Vsys and the battery voltage Vbat is, and the smaller the influence on the sensing accuracy of the current of the sensing resistor Rsen by the offset of the first operational amplifier OPA1 is.

Conversely, the larger the charging current of the battery is, the more the first transistors T11 to T1n are turned on by the control circuit 10. As a result, the resistance (of the first current mirror M1) of the switching charger is a low value such that a temperature of a cell phone being charged can be kept relatively low, and a charging efficiency of the cell phone can be improved.

Figure 4:
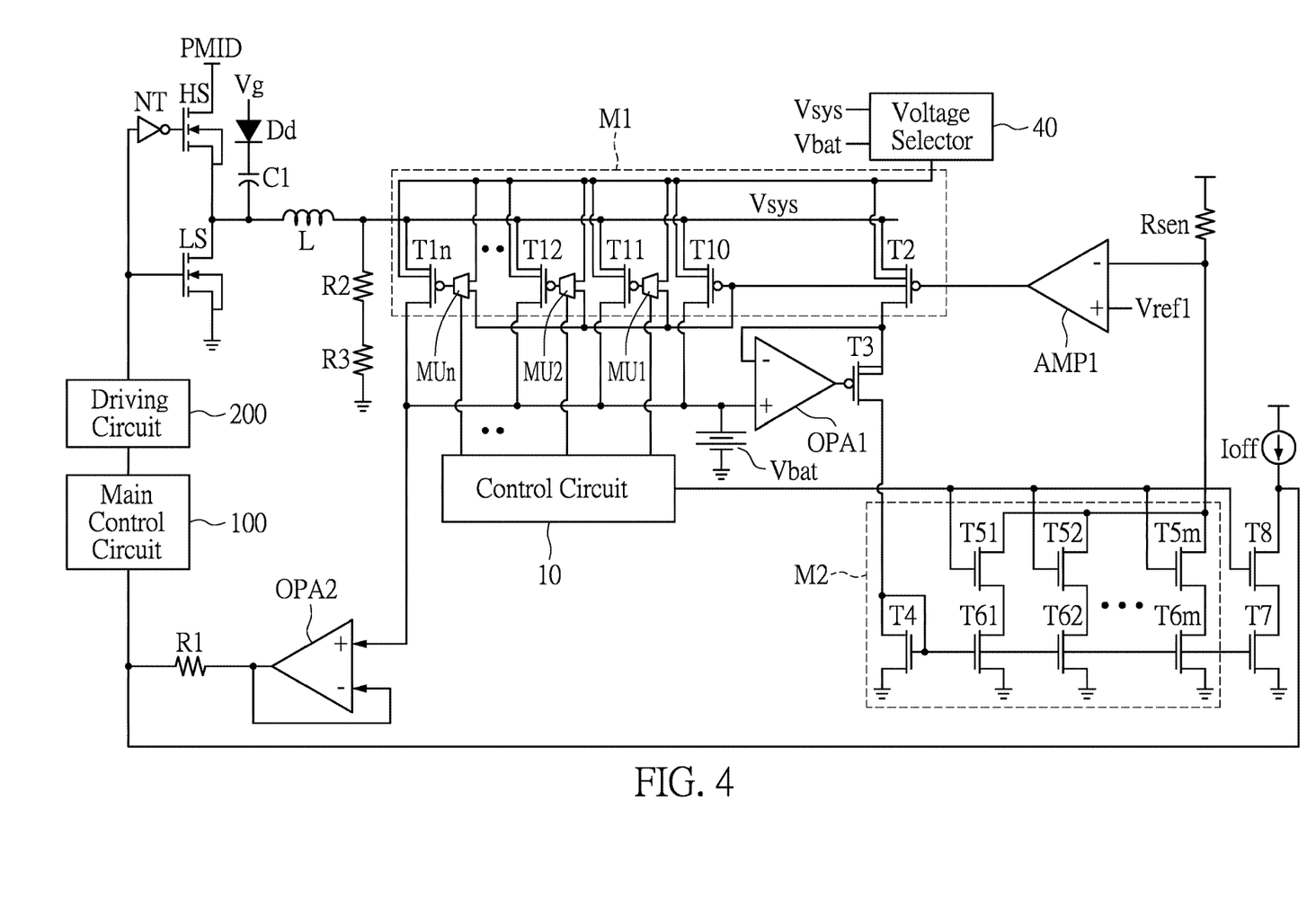
FIG. 4 is a circuit diagram of a switching charger for accurately sensing a small current according to a fourth embodiment of the present disclosure.

Reference is made to FIG. 4, which is a circuit diagram of a switching charger for accurately sensing a small current according to a fourth embodiment of the present disclosure. The same descriptions of the first and fourth embodiments of the present disclosure are not repeated herein.

The switching charger of the embodiment of the present disclosure may further include a seventh transistor T7, an eighth transistor T8 and a second operational amplifier OPA2.

A control terminal of the seventh transistor T7 may be connected to the control terminal of the fourth transistor T4. A first terminal of the seventh transistor T7 is grounded. A first terminal of the eighth transistor T8 may be connected to a second terminal of the seventh transistor T7. A control terminal of the eighth transistor T8 may be connected to the output terminal of the control circuit 10. The control circuit 10 may turn on or off the eighth transistor T8.

A first input terminal such as a non-inverting input terminal of the second operational amplifier OPA2 may be connected to the battery and obtain the battery voltage Vbat of the battery. That is, the first input terminal of the second operational amplifier OPA2 may be coupled to the battery voltage Vbat. A second input terminal such as an inverting input terminal of the second operational amplifier OPA2 may be connected to an output terminal of the operational amplifier OPA2 and a second terminal of the eighth transistor T8.

The output terminal of the operational amplifier OPA2 may be connected to a first terminal of a first resistor R1. A second terminal of the first resistor R1 may be connected to an input terminal of the main control circuit 100 and the second terminal of the eighth transistor T8. The second terminal of the eighth transistor T8 may be connected to a current source Ioff and receive a current from the current source Ioff. An output terminal of the main control circuit 100 may be connected to an input terminal of a driving circuit 200. An output terminal of the driving circuit 200 may be connected to a control terminal of a high-side switch HS through an inverter NT and connected to a control terminal of a low-side switch LS.

A first terminal of the high-side switch HS is coupled to a common voltage PMID. A second terminal of the high-side switch HS may be connected to a first terminal of the low-side switch LS. A second terminal of the low-side switch LS is grounded. A node between the first terminal of the low-side switch LS and the second terminal of the high-side switch HS may be connected to a first terminal of an inductor L. The first terminal of the inductor L may be connected to a first terminal of a capacitor C. A second terminal of the capacitor C may be coupled to an input voltage Vg. A second terminal of the inductor L may be grounded (through a second resistor R2 and a third resistor R3).

If necessary, the switching charger of the embodiment of the present disclosure may include a diode Dd. An anode terminal of the diode Dd is coupled to the input voltage Vg. A cathode terminal of the diode Dd may be connected to the second terminal of the capacitor C.

In the embodiment, the operational amplifier OPA2 may multiply a difference between the battery voltage Vbat and a voltage of the second terminal of the eighth transistor T8 (or a difference between the output current of the second current mirror M2 and the current of the current source Ioff) by a gain to output a second amplified signal. The main control circuit 100 may control the driving circuit 200 to drive the high-side switch HS and the low-side switch LS to adjust the system voltage Vsys according to the second amplified signal from the operational amplifier OPA2. As a result, the difference between the system voltage Vsys and the battery voltage Vbat may be adjusted according to the charging current of the battery such that the battery is charged more efficiently.

Figure 5:
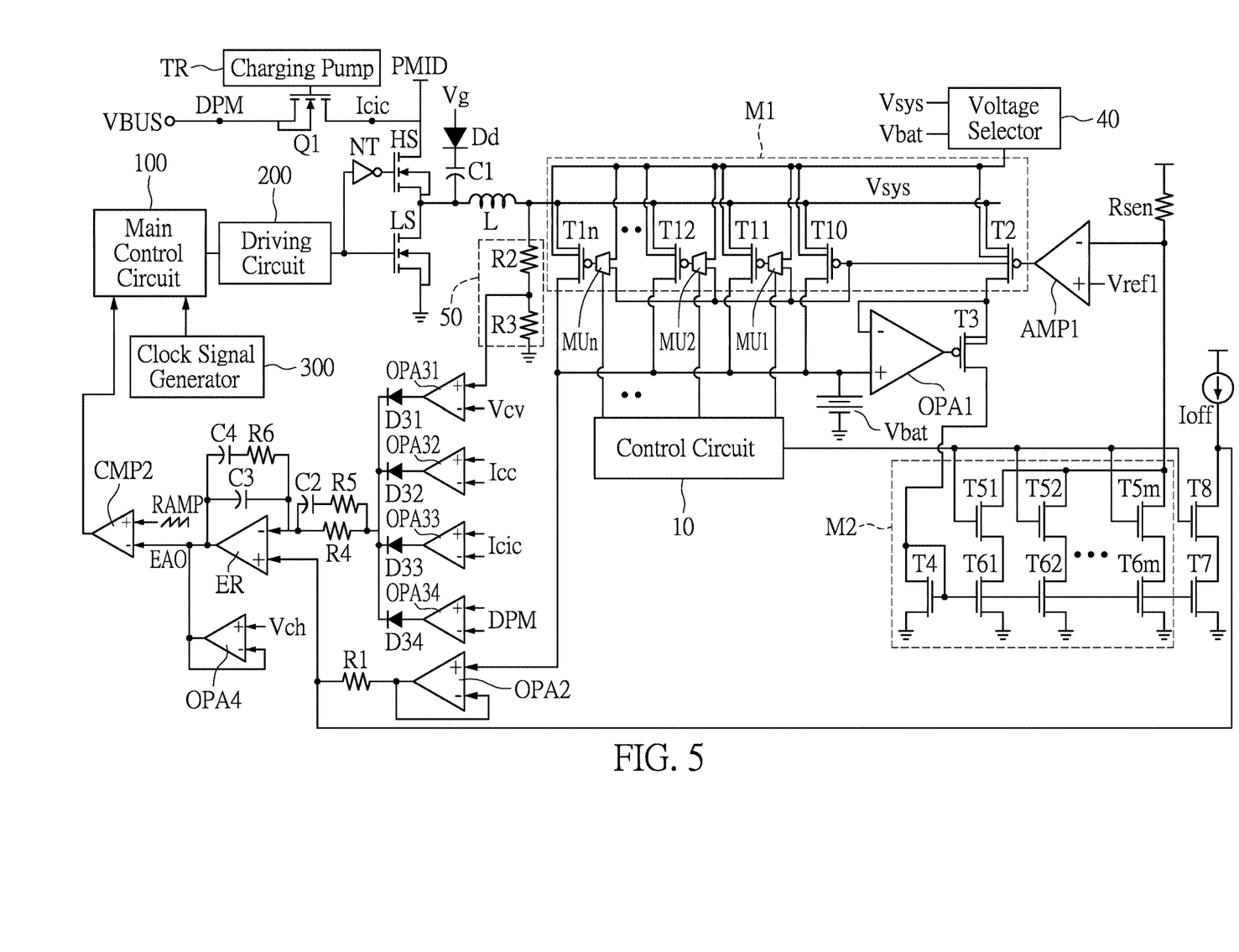
FIG. 5 is a circuit diagram of a switching charger for accurately sensing a small current according to a fifth embodiment of the present disclosure.

Reference is made to FIG. 5, which is a circuit diagram of a switching charger for accurately sensing a small current according to a fifth embodiment of the present disclosure. The same descriptions of the fourth and fifth embodiments of the present disclosure are not repeated herein.

In the embodiment, the switching charger of the present disclosure may, according to actual requirements, include one or more of: an error amplifier ER, a second comparator CMP2, a plurality of third operational amplifiers OPA31 to OPA34, a fourth operational amplifiers OPA4, the first resistor R1, a switch component Q1, a charging pump TR, a plurality of diodes D31 to D34, a fourth resistor R4, a fifth resistor R5, a third capacitor C3, a fourth capacitor C4 and a sixth resistor R6, but the present disclosure is not limited thereto.

The charging pump TR may be connected to a control terminal of the switch component Q1. The charging pump TR may provide power to the control terminal of the switch component Q1. A first terminal of the switch component Q1 may be coupled to a power voltage VBUS. A second terminal of the switch component Q1 may be connected to the first terminal of the high-side switch HS.

The first resistor R1 may be connected between the output terminal of the operational amplifier OPA2 and the second terminal of the eighth transistor T8. In detail, the first terminal of the first resistor R1 may be connected to the output terminal of the operational amplifier OPA2. The second terminal of the first resistor R1 may be connected to the second terminal of the eighth transistor T8.

A first input terminal such as a non-inverting input terminal of the error amplifier ER may be connected to the second terminal of the first resistor R1. If the first resistor R1 is omitted, the first input terminal of the error amplifier ER may be directly connected to the output terminal of the operational amplifier OPA2. A second input terminal such as an inverting input terminal of the error amplifier ER may be coupled to a second reference voltage.

For example, the second input terminal such as the inverting input terminal of the error amplifier ER may be connected to a node between a second terminal of the second resistor R2 of a voltage divider circuit 50 and a first terminal of the third resistor R3 of the voltage divider circuit 50. A voltage of the node between the second terminal of the second resistor R2 and the first terminal of the third resistor R3 may be used as the second reference voltage as described above. A first terminal of the second resistor R2 is connected to the second terminal of the inductor L. A second terminal of the third resistor R3 is grounded.

If necessary, the switching charger of the embodiment of the present disclosure may further include one or more of the plurality of third operational amplifiers OPA31 to OPA34. A first input terminal such as a non-inverting input terminal of the third operational amplifier OPA31 may be connected to the node between the second terminal of the second resistor R2 and the first terminal of the third resistor R3. A second input terminal such as an inverting input terminal of the third operational amplifier OPA31 may be coupled to a third reference voltage Vcv. For example, the third reference voltage Vcv may be a voltage of the first capacitor C1, but the present disclosure is not limited thereto.

The third operational amplifier OPA31 may multiply a difference between the third reference voltage Vcv and the voltage of the node between the second terminal of the second resistor R2 and the first terminal of the third resistor R3 by a gain to output a third amplified signal to the second input terminal such as the inverting an input terminal of the error amplifier ER.

Input terminals of the third operational amplifiers OPA32 to OPA34 may respectively receive other voltages, currents or other data (such as a capacitor current Icc of the first capacitor C1, a power voltage DPM and a power current Icic) of the switching charger. The third operational amplifiers OPA32 to OPA34 may output third amplified signals to the second input terminal such as the inverting input terminal of the error amplifier ER according to the received data (and reference voltages or reference currents).

First terminals such as anode terminals of the plurality of diodes D31 to D34 may be respectively connected to output terminals of the third operational amplifiers OPA31 to OPA34. Second terminals such as cathode terminals of the plurality of diodes D31 to D34 may be connected to a first terminal of the fourth resistor R4. A second terminal of the fourth resistor R4 may be connected to the second input terminal such as the inverting input terminal of the error amplifier ER. A first terminal of the fifth resistor R5 may be connected to the first terminal of the fourth resistor R4. A second terminal of the fifth resistor R5 may be connected to a first terminal of the second capacitor C2. A second terminal of the second capacitor C2 may be connected to the second terminal of the fourth resistor R4.

The second input terminal such as the inverting input terminal of the error amplifier ER may be connected to a first terminal of the third capacitor C3 and a first terminal of the sixth resistor R6. An output terminal of the error amplifier ER may be connected to a second terminal of the third capacitor C3 and a second terminal of the sixth resistor R6.

The error amplifier ER may output an error amplified signal EAO according to a difference between a voltage of the first input terminal of the error amplifier ER and a voltage of the second input terminal of the error amplifier ER.

A first input terminal such as a non-inverting input terminal of the second comparator CMP2 may be connected to an output terminal of a ramp signal generator and receive a ramp signal RAMP from the ramp signal generator.

A second input terminal such as an inverting input terminal of the second comparator CMP2 may be connected to the output terminal of the error amplifier ER. If necessary, the second input terminal such as the inverting input terminal of the second comparator CMP2 may be connected to an output terminal of the fourth operational amplifier OPA4. An output terminal of the second comparator CMP2 is connected to the input terminal of the main control circuit 100.

A first input terminal such as a non-inverting input terminal of the fourth operational amplifier OPA4 may be connected to a threshold voltage Vch. A second input terminal such as an inverting input terminal of the fourth operational amplifier OPA4 may be connected to the output terminal of the fourth operational amplifier OPA4. The fourth operational amplifier OPA4 may multiply a difference between a voltage of the first input terminal of the fourth operational amplifier OPA4 and a voltage of the second input terminal of the fourth operational amplifier OPA4 by a gain to output a fourth amplified signal.

The second comparator CMP2 may compare the ramp signal RAMP with the error amplified signal EAO of the error amplifier ER (or the fourth amplified signal of the fourth operational amplifier OPA4) to output a second comparing signal. The main control circuit 100 may control the driving circuit to drive the high-side switch HS and the low-side switch LS to adjust the system voltage Vsys to be slightly higher than the battery voltage Vbat, according to the second comparing signal (and a clock signal of a clock signal generator 300). As a result, the proportion of the offset voltage of the first operational amplifier OPA1 to the voltage difference between the system voltage Vsys and the battery voltage Vbat is reduced. The influence on the sensing accuracy of the current of the sensing resistor Rsen by the offset of the first operational amplifier OPA1 is reduced.

Figure 6:
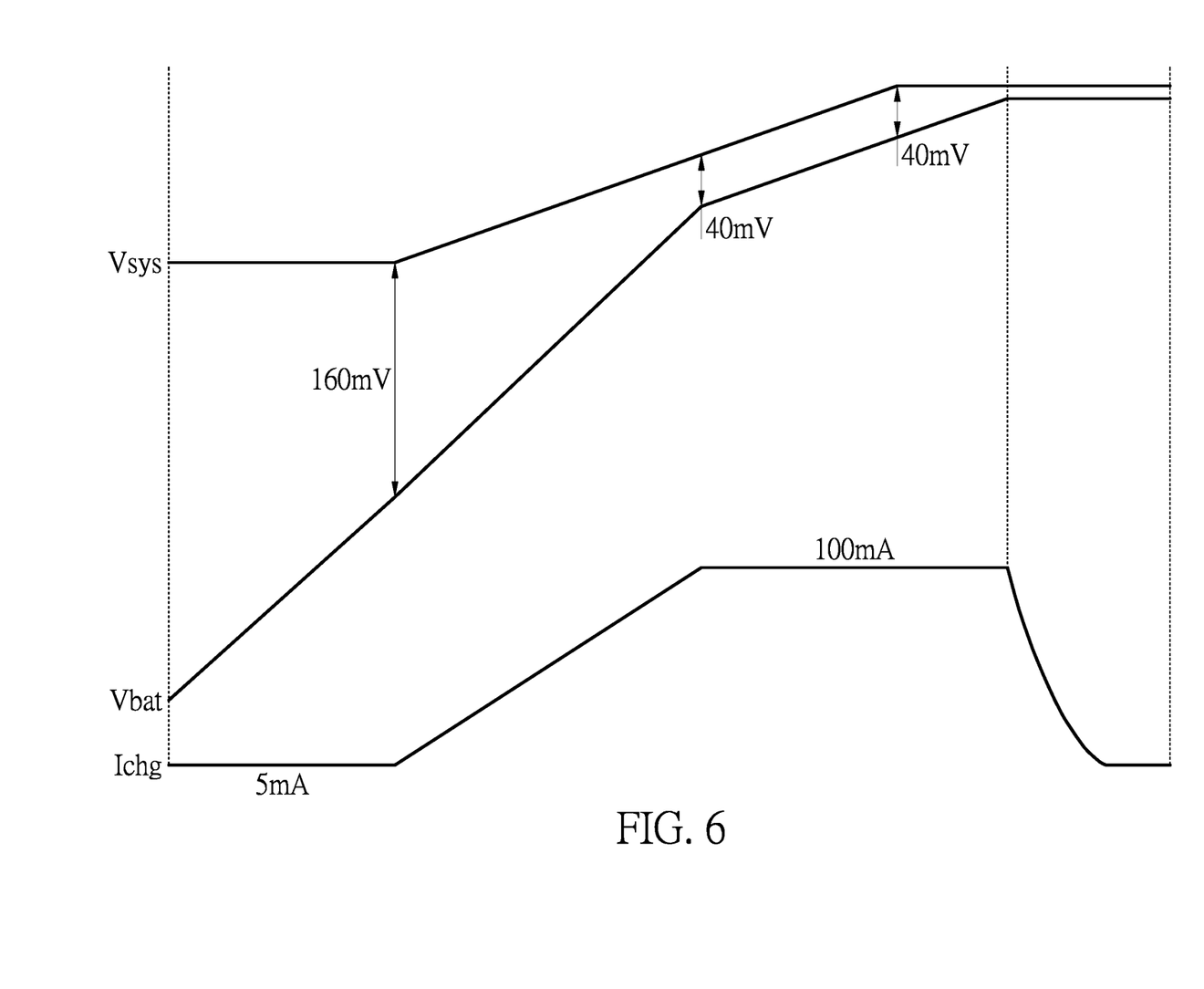
FIG. 6 is a schematic diagram of voltage signals and a current signal of the switching charger for accurately sensing the small current according to the first to fifth embodiments of the present disclosure.

Reference is made to FIG. 6, which is a schematic diagram of voltage signals and a current signal of the switching charger for accurately sensing the small current according to the first to fifth embodiments of the present disclosure.

As shown in FIG. 6, the switching charger of the embodiment of the present disclosure can adjust a difference between the battery voltage Vbat and the system voltage Vsys according to a value of a charging current Ichg of the battery. When the charging current Ichg of the battery decreases, the difference between the battery voltage Vbat and the system voltage Vsys increases. Conversely, when the charging current Ichg of the battery gradually increases, the difference between the battery voltage Vbat and the system voltage Vsys gradually decreases such that the charging efficiency of the battery is improved.

Figure 7:
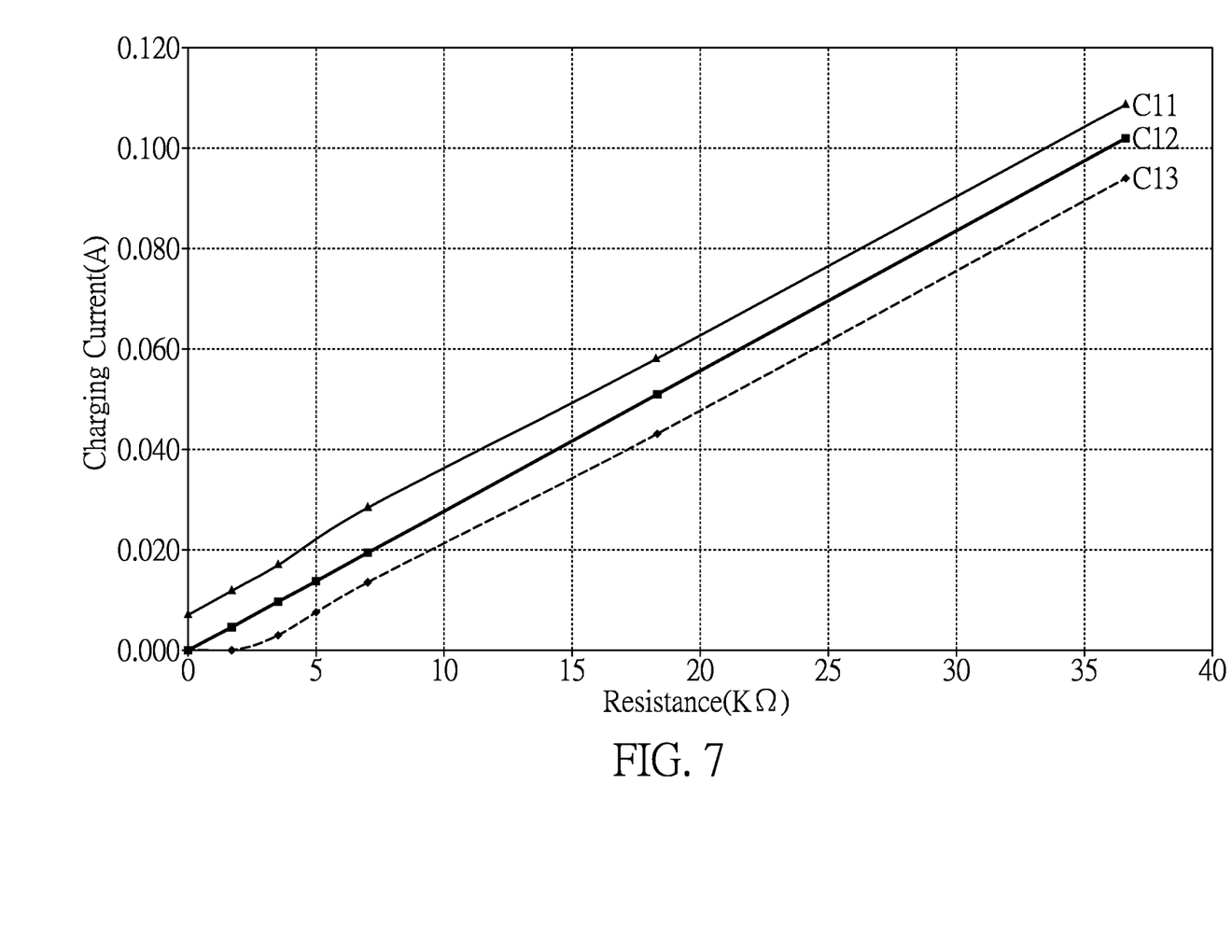
FIG. 7 is a schematic diagram of curves of charging currents to resistances of reference resistors of the switching charger of the second embodiment of the present disclosure and a conventional switching charger.

Reference is made to FIG. 7, which is a schematic diagram of curves of charging currents to resistances of reference resistors of the switching charger of the second embodiment of the present disclosure and a conventional switching charger.

For example, the reference resistor RSF of the switching charger as shown in FIG. 2 and the reference resistor of the conventional switching charger may be variable resistors. As shown in FIG. 7, the charging current of the switching charger of the embodiment of the present disclosure may be adjusted according to the resistance of the reference resistor RSF. Similarly, a charging current of the conventional switching charger may be adjusted according to a resistance of the reference resistor of the conventional switching charger.

All of the transistors of the conventional switching charger are always turned on. A curve C11 is a curve of the charging current of the conventional switching charger to the resistance of the reference resistor. The curve C11 is non-linear and cannot pass through a zero value point, which is caused by +0.48 mV of an offset voltage of an operational amplifier of the conventional switching charger. Similarly, a curve C13 is a curve of the charging current of the conventional switching charger to the resistance of the reference resistor. The curve C13 is nonlinear and cannot pass through the zero value point, which is caused by −0.48 mV of an offset voltage of the operational amplifier of the conventional switching charger.

A curve C12 is a curve of the charging current of the switching charger of the embodiment of the present disclosure to the resistance of the reference resistor RSF. The curve C12 is linear and passes through the zero value point. The curve C12 is completely unaffected by the offset voltage of the operational amplifier. It is therefore apparent that, as shown in FIG. 2, in the charging current of the switching charger of the embodiment of the present disclosure, the first transistors T11 to T1n of the first current mirror M1 can be switched to accurately adjust the charging current of the battery according to the resistance of the reference resistor RSF.

Figure 8:
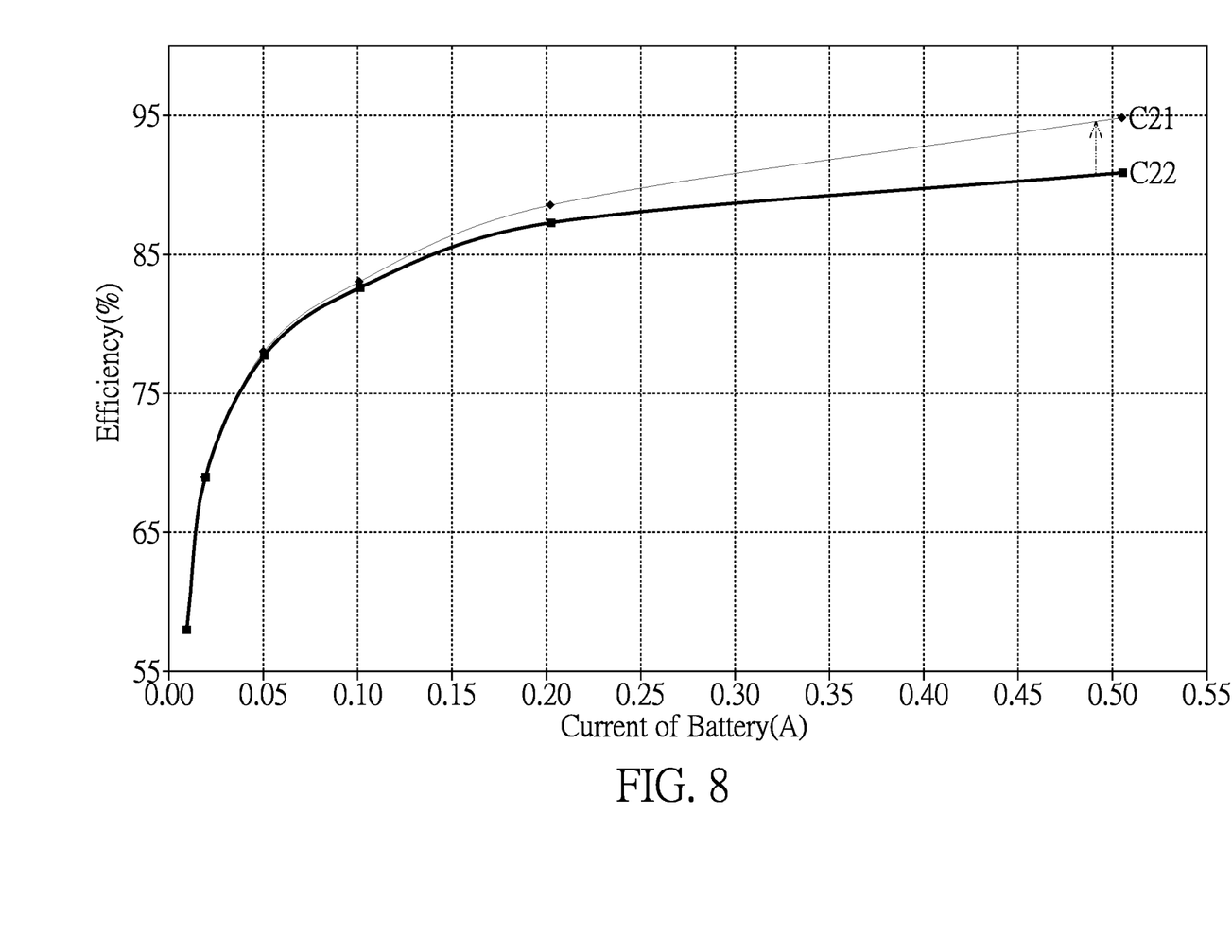
FIG. 8 is a schematic diagram of curves of efficiencies to currents of batteries of the switching charger of the first to fifth embodiments of the present disclosure and the conventional switching charger.

Reference is made to FIG. 8, which is a schematic diagram of curves of efficiencies to currents of batteries of the switching charger of the first to fifth embodiments of the present disclosure and the conventional switching charger.

In the switching charger of the present disclosure, the first transistors T11 to T1n of the first current mirror M1 can be selectively switched to adjust the resistance of the first current mirror M1 according to the value of the charging current of the battery. Further, the difference between the battery voltage Vbat and the system voltage Vsys is slightly adjusted according to the output current of the second current mirror M2 that is subtracted from the current of the current source Ioff.

In contrast, all of the transistors of the conventional switching charger are always turned on.

As shown in FIG. 8, a curve C21 is a curve of an efficiency of the switching charger of the present disclosure to the charging current of the battery. A curve C22 is a curve of an efficiency of the conventional switching charger to the charging current of the battery. It is apparent that, in the switching charger of the present disclosure, the voltage difference between the battery voltage Vbat and the system voltage Vsys may be adjusted according to the charging current of the battery. Therefore, the efficiency of the switching charger of the present disclosure is higher than the efficiency of the conventional switching charger.

In conclusion, the present disclosure provides the switching charger for accurately sensing a small current. In the switching charger of the present disclosure, the plurality of first transistors and the plurality of fifth transistors can be selectively turned off to selectively adjust the ratio of the input current and the output current of the first current mirror and/or the ratio of the input current and the output current of the fifth current mirror. As a result, the current of the sensing resistor is adjusted. In particular, the current of the sensing resistor that is smaller than the current threshold is increased. The adjusted current is used as the current sensed by the switching charger of the present disclosure. Furthermore, the voltage difference between the system voltage and the battery voltage can be adjusted according to the charging current of the battery such that the charging efficiency of the switching charger of the present disclosure is improved. The proportion of the offset voltage of the first operational amplifier to the voltage difference between the system voltage and the battery voltage is reduced such that the influence on the sensing accuracy of the sensed current of the sensing resistor by the offset of the first operational amplifier is reduced. Therefore, the external processor circuit can perform appropriate operations according to the value of the sensed current.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A switching charger for accurately sensing a small current, comprising:
    a first current mirror including a plurality of first transistors and a second transistor, a first terminal of each of the plurality of first transistors and a first terminal of the second transistor are coupled to a system voltage, and a second terminal of each of the plurality of first transistors is connected to a battery;
    a first operational amplifier, wherein a first input terminal of the first operational amplifier is connected to the battery and obtains a voltage of the battery;
    a third transistor, wherein a first terminal of the third transistor is connected to a second terminal of the second transistor and a second input terminal of the first operational amplifier, and a control terminal of the third transistor is connected to an output terminal of the first operational amplifier;
    a second current mirror including:
        a fourth transistor, wherein a first terminal of the fourth transistor is connected to a second terminal of the third transistor and a control terminal of the fourth transistor, and a second terminal of the fourth transistor is grounded;
        a plurality of fifth transistors, wherein a first terminal of each of the plurality of fifth transistors is connected to a first terminal of a sensing resistor, and a second terminal of the sensing resistor is coupled to an input voltage; and
        a plurality of sixth transistors, wherein first terminals of the plurality of sixth transistors are respectively connected to second terminals of the plurality of fifth transistors, a second terminal of each of the plurality of sixth transistors is grounded, and control terminals of the plurality of sixth transistors are connected to a control terminal of the fourth transistor; and
    a control circuit, wherein a control terminal of one of the plurality of first transistors is connected to a control terminal of the second transistor, and the control circuit is connected to control terminals of others of the plurality of first transistors and a control terminal of each of the plurality of fifth transistors;
    wherein the control circuit selectively turns off the plurality of first transistors and the plurality of fifth transistors to adjust a value of a current flowing through the sensing resistor.

2. The switching charger according to claim 1, further comprising:
    a reference resistor, wherein a first terminal of the reference resistor is connected to the control circuit, a second terminal of the reference resistor is grounded, and the control circuit selectively turns off the plurality of first transistors and the plurality of fifth transistors according to a resistance of the reference resistor.

3. The switching charger according to claim 2, further comprising:
    a reference current source connected to the first terminal of the reference resistor and configured to provide a reference current to the reference resistor, wherein the control circuit multiplies the resistance of the reference resistor by a value of the reference current to obtain a voltage of the reference resistor, and selectively turns off the plurality of first transistors and the plurality of fifth transistors according to the voltage of the reference resistor.

4. The switching charger according to claim 3, further comprising:
a detector circuit connected to the control circuit and the first terminal of the reference resistor, and configured to detect and provide a voltage of the first terminal of the reference resistor or the resistance of the reference resistor to the control circuit.

5. The switching charger according to claim 1, wherein the control circuit is connected to a storage circuit, and selectively turns off the plurality of first transistors and the plurality of fifth transistors according to data provided by the storage circuit.

6. The switching charger according to claim 1, wherein the control circuit selectively turns off the plurality of first transistors and the plurality of fifth transistors according to a charging current of the battery.

7. The switching charger according to claim 1, further comprising:
a voltage selector, wherein an input terminal of the voltage selector is connected to the battery and coupled to the system voltage, and an output terminal of the voltage selector is connected to a fourth terminal of each of the plurality of first transistors and a fourth terminal of the second transistor;
wherein the voltage selector is configured to select and output a highest one of the system voltage and the voltage of the battery to the fourth terminal of each of the plurality of first transistors and the fourth terminal of the second transistor.

8. The switching charger according to claim 7, further comprising:
a first amplifier, wherein a first input terminal of the first amplifier is connected to the first terminal of the sensing resistor, a second input terminal of the first amplifier is coupled to a first reference voltage, and an output terminal of the first amplifier is connected to the control terminal of each of the plurality of first transistors and the control terminal of the second transistor;
wherein the first amplifier is configured to amplify a difference between a voltage of the first terminal of the sensing resistor and the first reference voltage to output an amplified signal to the control terminal of each of the plurality of first transistors and the control terminal of the second transistor.

9. The switching charger according to claim 8, further comprising:
a first comparator, wherein a first input terminal of the first comparator is coupled to the system voltage, a second input terminal of the first comparator is connected to the battery and obtains the voltage of the battery, and an output terminal of the first comparator is connected to an input terminal of the control circuit.

10. The switching charger according to claim 9, wherein the second input terminal of the first comparator is connected to a first terminal of a voltage source, and a second terminal of the voltage source is connected to the battery.

11. The switching charger according to claim 8, further comprising:
a plurality of multiplexers, wherein a first input terminal of each of the plurality of multiplexers is connected to the output terminal of the voltage selector, second input terminals of the plurality of multiplexers are connected to the output terminal of the first amplifier, and output terminals of the plurality of multiplexers are respectively connected to the control terminals of the plurality of first transistors;
wherein the control circuit is connected to a control terminal of each of the plurality of multiplexers, and the control circuit controls the plurality of multiplexers to respectively control the plurality of first transistors according to an amplified signal outputted by the first amplifier or according to the highest one of the system voltage and the voltage of the battery that is selected by the voltage selector.

12. The switching charger according to claim 1, further comprising:
a seventh transistor, wherein a control terminal of the seventh transistor is connected to the control terminal of the fourth transistor, and a first terminal of the seventh transistor is grounded;
an eighth transistor, wherein a first terminal of the eighth transistor is connected to a second terminal of the seventh transistor, and a control terminal of the eighth transistor is connected to the control circuit; and
a second operational amplifier, wherein a first input terminal of the second operational amplifier is connected to the battery and obtains the voltage of the battery, and an output terminal of the second operational amplifier is connected to a second input terminal of the second operational amplifier and a second terminal of the eighth transistor.

13. The switching charger according to claim 12, further comprising:
a main control circuit, wherein an input terminal of the main control circuit is connected to the output terminal of the second operational amplifier;
a driving circuit, wherein an input terminal of the driving circuit is connected to an output terminal of the main control circuit;
a high-side switch, wherein a first terminal of the high-side switch is coupled to a common voltage, and a control terminal of the high-side switch is connected to an output terminal of the driving circuit; and
a low-side switch, wherein a first terminal of the low-side switch is connected to a second terminal of the high-side switch, a second terminal of the low-side switch is grounded, and a control terminal of the low-side switch is connected to the output terminal of the driving circuit;
wherein a node between the first terminal of the low-side switch and the second terminal of the high-side switch is connected to a first terminal of an inductor, and a second terminal of the inductor is grounded.

14. The switching charger according to claim 13, further comprising:
a first resistor, wherein a first terminal of the first resistor is connected to the output terminal of the second operational amplifier, and a second terminal of the first resistor is connected to the second terminal of the eighth transistor.

15. The switching charger according to claim 14, further comprising:
an error amplifier, wherein a first input terminal of the error amplifier is connected to the second terminal of the first resistor, and a second input terminal of the error amplifier is coupled to a second reference voltage.

16. The switching charger according to claim 15, further comprising:
a voltage divider circuit including a second resistor and a third resistor, wherein a first terminal of the second resistor is connected to the second terminal of the inductor, a second terminal of the second resistor is connected to a first terminal of the third resistor, and a second terminal of the third resistor is grounded;

wherein a voltage of a node between the second terminal of the second resistor and the first terminal of the third resistor is used as the second reference voltage.

17. The switching charger according to claim 16, further comprising:

a second comparator, wherein a first input terminal of the second comparator is connected to an output terminal of a ramp signal generator, a second input terminal of the second comparator is connected to an output terminal of the error amplifier, and an output terminal of the second comparator is connected to the input terminal of the main control circuit.

18. The switching charger according to claim 17, further comprising:

a third operational amplifier, wherein a first input terminal of the third operational amplifier is connected to the node between the second terminal of the second resistor and the first terminal of the third resistor, a second input terminal of the third operational amplifier is coupled to a third reference voltage, and an output terminal of the third operational amplifier is connected to the second input terminal of the error amplifier.

19. The switching charger according to claim 18, further comprising:

a fourth resistor, wherein a first terminal of the fourth resistor is connected to the output terminal of the third operational amplifier, and a second terminal of the fourth resistor is connected to the second input terminal of the error amplifier.

* * * * *